(12) United States Patent
Sadri et al.

(10) Patent No.: US 7,841,932 B2
(45) Date of Patent: Nov. 30, 2010

(54) METHOD OF PLAYING A GAME OF CHANCE AND POINT OF SALE SYSTEM FOR FACILITATING THE PLAY THEREOF

(76) Inventors: Amir Sadri, 105 Falcon Cir., East Greenwich, RI (US) 02818; Robert Ross Henderson, 500 Kilvert St., Warwick, RI (US) 02886; Richard Finnochio, 46 Dartmouth St., Everett, MA (US) 02149

( * ) Notice: Subject to any disclaimer, the term of this patent is extended or adjusted under 35 U.S.C. 154(b) by 1567 days.

(21) Appl. No.: 10/138,761

(22) Filed: May 3, 2002

(65) Prior Publication Data
US 2003/0207708 A1 Nov. 6, 2003

(51) Int. Cl.
*A63F 9/24* (2006.01)
*A63F 13/00* (2006.01)

(52) U.S. Cl. .............................. 463/16; 463/17; 463/25; 273/138.1; 273/138.2

(58) Field of Classification Search ............. 463/16–17, 463/22, 26, 29; 273/138.1–2, 139
See application file for complete search history.

(56) References Cited

U.S. PATENT DOCUMENTS

| | | | |
|---|---|---|---|
| 4,671,512 A | | 6/1987 | Bachman et al. |
| 4,738,473 A | | 4/1988 | Meloni et al. |
| 4,764,666 A | | 8/1988 | Bergeron |
| 4,817,949 A | | 4/1989 | Bachman et al. |
| 4,854,590 A | * | 8/1989 | Jolliff et al. .................... 463/17 |
| 4,880,964 A | | 11/1989 | Donahue |
| 4,993,714 A | * | 2/1991 | Golightly .................... 463/17 |
| 5,074,566 A | | 12/1991 | Desbiens |
| 5,235,167 A | | 8/1993 | Dvorkis et al. |
| 5,239,165 A | | 8/1993 | Novak |
| 5,269,521 A | * | 12/1993 | Rossides .................... 705/14 |
| 5,290,033 A | | 3/1994 | Bittner et al. |
| 5,317,135 A | | 5/1994 | Finocchio |
| 5,413,341 A | | 5/1995 | Lieberman |
| 5,772,510 A | * | 6/1998 | Roberts .................... 463/17 |

(Continued)

FOREIGN PATENT DOCUMENTS

EP 0 857 079 B1 1/2002

(Continued)

OTHER PUBLICATIONS

Scarne, John, "Scarne's New complete Guide to Gambling", 1974, Simon and Schuster, p. 186-204.*

(Continued)

*Primary Examiner*—John M Hotaling, II
*Assistant Examiner*—Ryan Hsu
(74) *Attorney, Agent, or Firm*—Sullivan & Worcester LLP; Christopher T. McWhinney

(57) ABSTRACT

A method for playing a game of chance and system for facilitating the play of the game are disclosed. The method of playing the game of chance includes making a purchase transaction having an associated transaction price. The method of playing the game of chance further includes receiving a lottery number. The method of playing a lottery game further includes receiving a prize if a predetermined function of the lottery number and the transaction price satisfies a predetermined matching condition.

40 Claims, 11 Drawing Sheets

U.S. PATENT DOCUMENTS

| | | | |
|---|---|---|---|
| 5,996,997 | A | 12/1999 | Kamille |
| 6,223,163 | B1 | 4/2001 | Van Luchene |
| 6,267,670 | B1 * | 7/2001 | Walker et al. ............... 463/17 |
| 6,296,569 | B1 | 10/2001 | Congello, Jr. |
| 6,308,991 | B1 | 10/2001 | Royer |
| 6,578,735 | B1 | 6/2003 | Mothwurf |
| 6,582,304 | B2 * | 6/2003 | Walker et al. ............... 463/17 |
| 6,598,024 | B1 | 7/2003 | Walker et al. |
| 6,663,105 | B1 * | 12/2003 | Sullivan et al. ......... 273/138.2 |
| 6,899,621 | B2 | 5/2005 | Behm et al. |
| 7,027,850 | B2 | 4/2006 | Wasserman |
| 2001/0520832 | | 12/2001 | Willins et al. |
| 2004/0242308 | A1 | 12/2004 | Gray |

FOREIGN PATENT DOCUMENTS

| | | |
|---|---|---|
| EP | 1388139 | 11/2002 |
| EP | 0 865 808 B1 | 3/2003 |
| GB | 2171054 A | 8/1986 |
| GB | 2 195 292 | 3/1988 |
| WO | WO 96/18174 A | 6/1996 |
| WO | 97/14482 | 4/1997 |
| WO | 2002/093518 | 11/2002 |
| WO | WO 02/093518 | 11/2002 |
| WO | WO 02/093518 A | 11/2002 |

OTHER PUBLICATIONS

"Georgia Startup", La Fleur's, vol. 9, No. 6, Feb. 2002, p. 7.
Later Publication of Declaration Under Article I7(2)(a) for the International Patent Application No. PCT/IB2003/001893.
European Patent Office Communication for European Patent Application No. 03 719 011.3 dated May 21, 2007.
European Patent Office Communication for European Patent Application No. 03 719 011.3 dated Apr. 20, 2007.
European Patent Office Communication for European Patent Application No. 03 719 011.3 dated Apr. 3, 2007.
European Patent Office Communication for European Patent Application No. 03 719 011.3 dated Jun. 23, 2006.
European Patent Office Communication for European Patent Application No. 03 719 011.3 dated May 27, 2005.

* cited by examiner

| | | | | |
|---|---|---|---|---|
| 123456 | .57 | 1/10/02 3:54 | 10$ | 1/10/02 3.58 |
| 123457 | 1.01 | 1/10/02 3 54 | LOSER | NA |
| 123458 | .23 | 1/10/02 3:56 | 2$ | UNREDEEMED |
| 123459 | .39 | 1/10/02 4.05 | LOSER | NA |

Figure 11a

| 123458 | .23 | 1/10/02 3:56 | 2$ | UNREDEEMED |
|---|---|---|---|---|

Figure 11b

METHOD OF PLAYING A GAME OF CHANCE AND POINT OF SALE SYSTEM FOR FACILITATING THE PLAY THEREOF

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND INFORMATION

Lottery game tickets are frequently sold in retail establishments such as convenience stores, liquor stores, and the like. These and other establishments selling lottery tickets are sensitive to the costs of counter space used, and labor required in the sale and redemption of lottery tickets. Having separate point of sale terminals for lottery tickets and other merchandise may increase these costs. In response, point of sale terminals that combine lottery ticket sales and redemption and regular merchandise point of sale functions have been proposed. Promotional games may also be used at point of sale terminals, e.g., providing free game chances to purchasers who meet minimum purchase requirements.

The combination of lottery and standard point of sale terminals has given rise to a "change game" where customers may purchase a fractional lottery ticket in a future lottery drawing, rather than receiving change. Such an approach may cut change processing costs of retailers and boost lottery sales. Change games presently sell consumers a fractional ticket in a weekly or other regular lottery drawing, where the tickets normally have a fixed unit cost.

Some lottery customers do not want to wait for a weekly or daily drawing. These customers may purchase "instant win" lottery tickets. Such tickets may also involve games, e.g., bingo or number matching, that increase customer interest and enjoyment in the purchase of such tickets. Instant win lottery tickets are generally sold to retailers in pre-printed books or bundles. A pre-printed ticket may have a printed indicia or message indicating the ticket is a winner and/or the prize amount, as well as human or machine readable codes for authenticating winning tickets. These indicia, messages, and codes may be hidden, e.g., with a peel-off or scratch-off coating. Conventional instant-win tickets for lottery or promotion games, which are preprinted, may not be suitable for use in games where the prize amounts or game information are not determined until the time of purchase, e.g., a game where the prize structure varies as a function of the game price such as a fractional ticket or "change game".

BRIEF DESCRIPTION OF THE DRAWINGS

FIG. 10$b$ illustrates an example entry from the example prize pool, according to an example embodiment of the present invention.

FIG. 11$a$ illustrates an example ticket log, according to an example embodiment of the present invention.

FIG. 11$b$ illustrates an example entry from the example ticket log, according to an example embodiment of the present invention.

DETAILED DESCRIPTION OF EXAMPLE EMBODIMENTS

Example Procedure for Playing a Lottery Game

Figure 1:
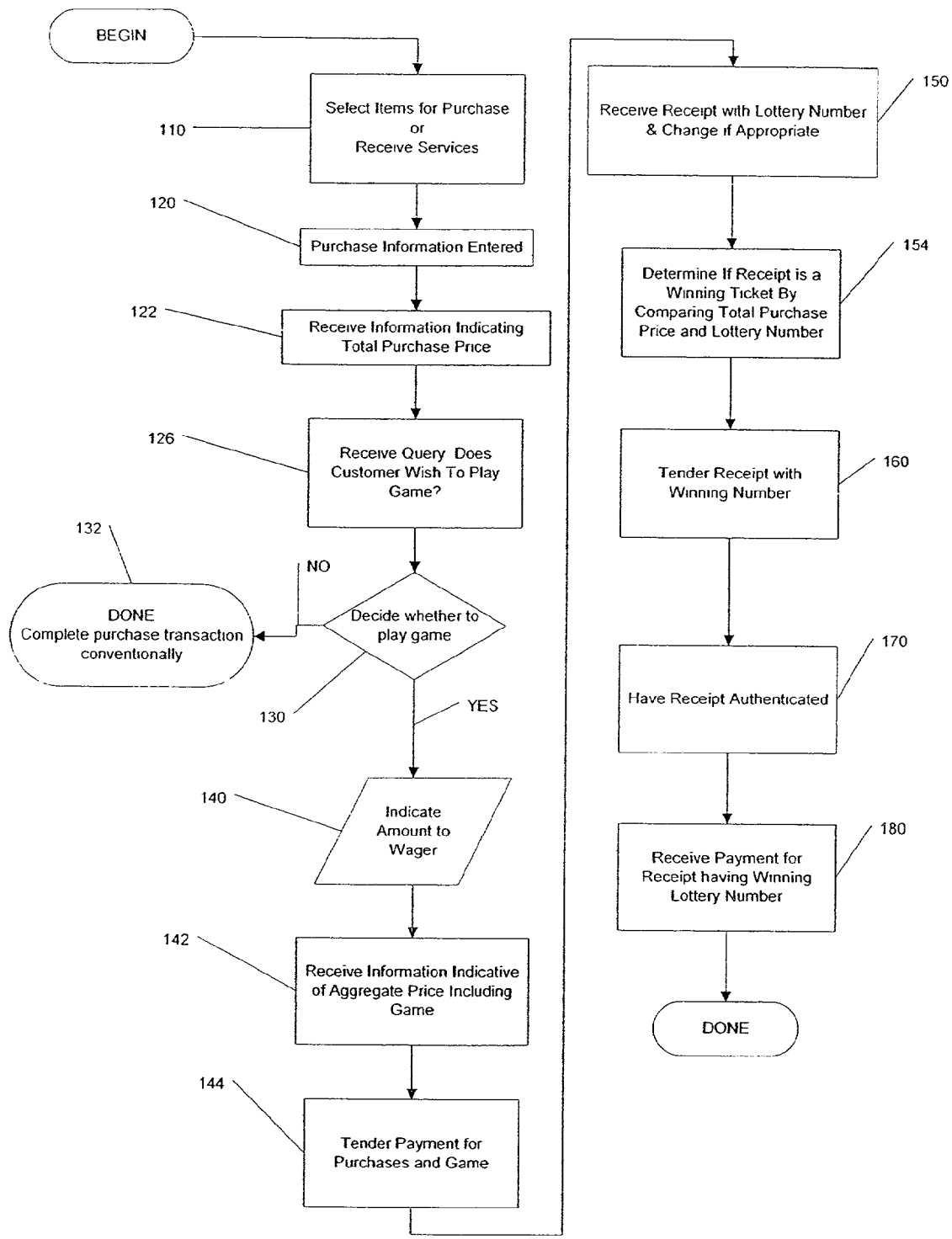
FIG. 1 illustrates an example procedure for playing a game of chance, according to an example embodiment of the present invention.

FIG. 1 illustrates an example procedure for playing a game of chance, according to an example embodiment of the present invention. The game of chance may be an instant win lottery which employs price information from a customer's non-lottery purchases as part of the lottery game. The game may be facilitated by a point of sale terminal with the capability to print conventional purchase receipts that also include lottery game information. The game may also be facilitated if the point of sale terminal has the capability to handle redemption of winning receipts. It will be appreciated that redemptions, particularly for large prizes, may also be handled in a different manner or at a different location.

In 110, a customer may select items for purchase or receive services for which payment may be required. Examples of such purchases may include restaurant meals, food or beverages purchased at a store, or tickets for an entertainment event or mass transportation.

In 120, information about the purchased goods or services may be entered in a point of sale terminal, e.g., by a cashier or attendant, or by a customer at an automated point of sale terminal. In 122, the total price of the merchandise or services received by the customer may be displayed. The price information may be displayed directly to the customer. Alternatively, the total price information may be communicated in a different manner, e.g., by displaying the information to the cashier or attendant, who in turn communicates the information to the customer.

In 126, the customer may be asked if they wish to play the game of chance. This may be accomplished by having the cashier ask the customer. The point of sale terminal may prompt the cashier to inquire whether the customer wishes to play the game of chance. Alternatively, the query may be displayed directly to the customer, e.g., on a display provided for customer viewing in a point of sale terminal.

In 130, the customer may decide whether to play the game of chance. The customers decision may be received or recorded in a variety of ways, e.g., by having the customer press a button or enter information on a keypad, or by having the customer tell the cashier, who may then enter the information. If the customer decides not to play the game of chance, the example game playing procedure may continue with 134, and may be completed like any conventional purchase transaction at point of sale terminal. If the customer elects to play the game of chance, then the example game playing procedure may continue with 140.

In 140, the customer may indicate the amount they wish to wager in the game of chance. The customer may tell the cashier the amount, and the cashier may enter the amount in the point of sale terminal. Alternatively, the amount may be entered by the customer directly, e.g., with a self-serve point of sale terminal or on a keypad provided for customer use on a conventional attended point of sale terminal. It will be appreciated that in a promotional game, there may be no amount wagered, rather the game chance may be provided free to customers who meet predefined promotion criteria, e.g., making a purchase of a minimum size.

In 142, the customer may be informed of the aggregate amount due. The aggregate amount information provided may include both the original purchase price of goods and services, and the amount wagered in the game of chance. This information may be displayed directly to the customer by the point of sale terminal, or may be displayed to the cashier, who may inform the customer of the amount.

In 144, an amount may be tendered that is sufficient to cover both the original purchase price and the amount wagered in the game of chance. The amount may be tendered as cash, check, debit card, credit card, or other form.

In 150, the customer may receive a receipt for the purchase. The receipt may include a lottery number for the game of chance. The receipt may also include information about the total price for the original non-gaming purchase, information regarding the authenticity of the ticket, and advertising information. The receipt may include an indication of whether the ticket is a winner, e.g., a printed message or a symbolic indicia. The receipt may also include information about the maximum possible pay out of the game. It will be appreciated that a separate lottery ticket with a lottery number may be received, as long as the lottery ticket includes information about the transaction price. In this alternative case, information that that associates the separate lottery ticket and receipt together may need to be provided, e.g., by putting the receipt number from the receipt on the separate lottery ticket.

In 154, the purchaser may examine the receipt to determine if it is a winning ticket. In the example procedure for playing the game, whether a particular receipt is a winning ticket may be ascertained by determining whether a predetermined function of the least one lottery number and a transaction price meets a predetermined matching condition. For example, the digits of the lottery number may be compared with the original total transaction price for the merchandise received (without the wager). Depending on the rules selected by the game sponsor, the transaction price may also be the total price of goods and services purchased, the aggregate price of goods and services purchased and the amount wagered in the lottery game, or the price of one or more goods or services that were purchased. It will be appreciated that other transaction price information may also be used in determining a winning ticket.

In addition to varying the transaction price used for matching, different predetermined matching functions may be selected for determining a winning ticket, e.g., by the game sponsor when the game is designed. One example predetermined matching function is satisfied if any digits of the transaction price and the lottery price are identical. In this case, the value of the prize may vary by the actual the position of the digits in the transaction price and lottery number that match. For example, the prize may be $1.00 if the second decimal digit ($1/100$s) of the transaction price is matched, $5.00 if the first decimal digit ($1/10$s) is matched, $10.00 if the first whole digit is matched, and $50.00 if the second whole digit is matched. Different prizes may be awarded for matching multiple digits, or for meeting other matching conditions. A large jackpot prize may be won if every digit in the lottery number matches the corresponding digits in the transaction price.

It will be appreciated that other predetermined functions and matching conditions may be used to determine whether or not the game has been won. For example, the position of the digits may be ignored, so as long as the correct digits are present the ticket is a winner. Alternatively, the game may be won when the sum of the digits in the total price is matched by the sum of the digits in the lottery number, or if the lottery number is greater than or less than the total price. Comparisons may also be made between the lottery number and other price information, e.g., the ticket may win if any item was purchased with a price that matches the lottery ticket.

It will be appreciated that other methods of determining if the ticket is a winning ticket may be included in the example gaming procedure. For example, an indicia or text message may alert the customer that the ticket is a winning ticket. A machine readable code may be included on the receipt, which when scanned may allow the reading machine to give a visual or auditory signal that the ticket is a winner.

In an alternative version of the example game that may be played separately or in addition to the example lottery game, the customer may choose numbers that the customer wishes to try and match against the lottery number. The customer would then win if a predetermined function of the chosen numbers and the lottery numbers satisfies a predetermined matching condition. In this alternative version, the predetermined function and matching condition may be the same as or different than the ones used in the example game that involves the transaction price and the lottery number.

In 160, if the customer has a winning ticket, the customer may tender the ticket, e.g., by presenting it to the cashier. The gaming procedure may require tickets be redeemed immediately at the same point of sale terminal where they are sold, or may allow tickets to be redeemed at a future time and at various locations.

In 170, the receipt may be authenticated to determine whether the ticket is actually a valid winning ticket, e.g., if the ticket has a winning number and has not previously been redeemed. Conventional schemes for authenticating ticket numbers may be employed, e.g., the authentication number may be used as part of public key encryption system. The fact that the ticket is being redeemed may be recorded, so that the ticket may not be redeemed again in the future.

In 180, if the ticket is valid, a prize may be paid for the winning ticket. The correct prize may be determined by a comparison of the lottery number and the price information on the receipt. In an alternative version of the example game, the prize may be determined by comparison of a customer chosen number and the lottery number. Other approaches for determining the size of the prize may also be provided. For example, the prize may vary as a function of the original transaction price. A winning ticket bought at a restaurant point of sale terminal might have as a prize the price of the meal that was originally paid for when the ticket was purchased.

Once the prize is paid, this may complete the example game playing procedure.

Example Procedure for Facilitating Lottery Game Play

Figure 2:
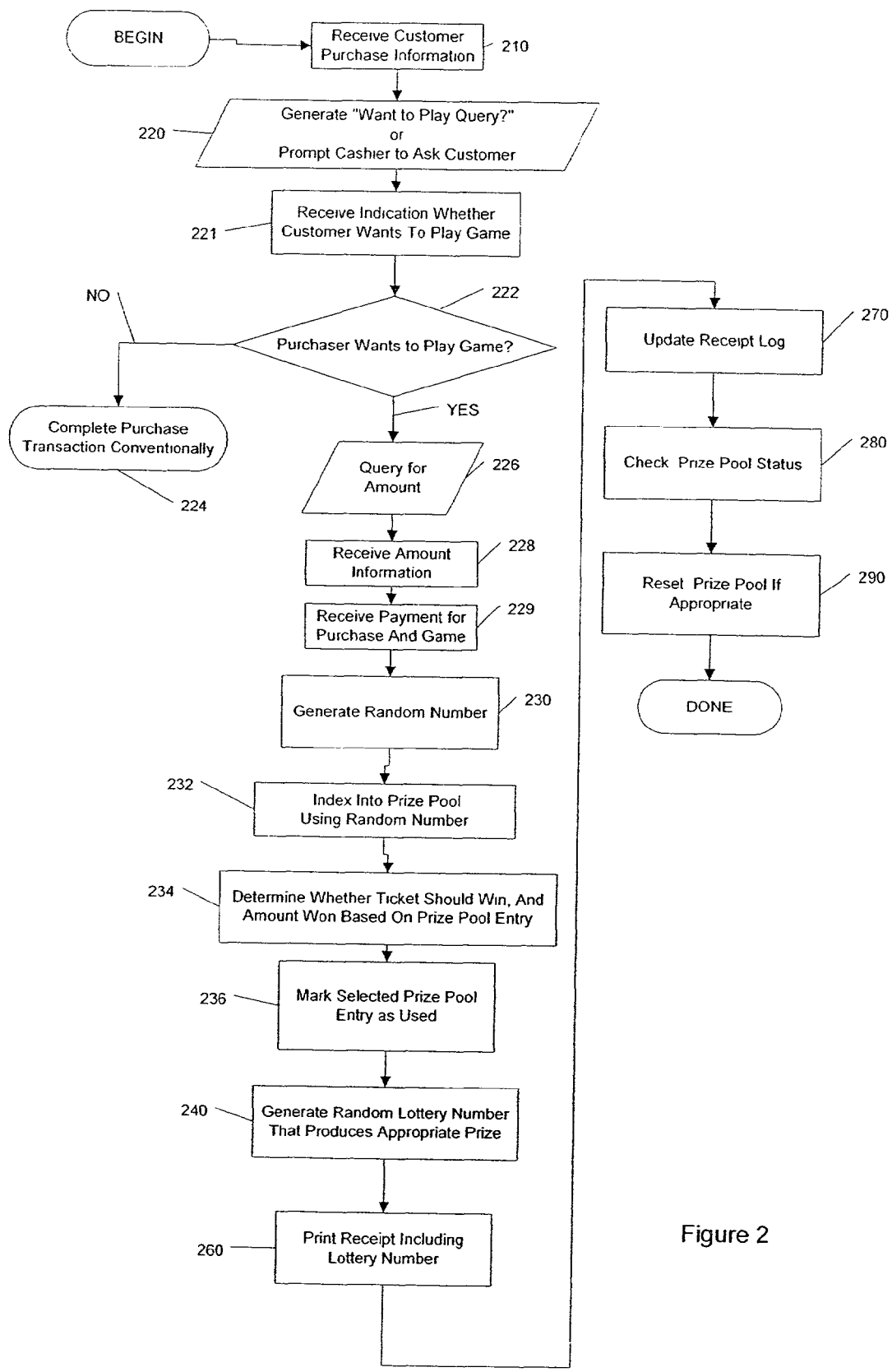
FIG. 2 illustrates an example procedure for facilitating the play of a game of chance, according to an example embodiment of the present invention.

FIG. 2 illustrates an example procedure for facilitating the play of a game of chance, according to an example embodiment of the present invention. The procedure may be accomplished using a point of sale terminal configured for handling non-gaming purchases that has an added capabilities for facilitating the sale and redemption of lottery game chances in a lottery game whose tickets are the receipts for the non-gaming purchases. A customer may arrive at the point of sale terminal to make a payment for a purchased product or service. It will be appreciated that the point of sale terminal may be operated by a cashier, but may also be a self-service or automated point of sale machine.

In 210, customer purchase information may be received, e.g., by the point of sale terminal. The purchase information may include the identity of goods or services that are being purchased by a customer. The information may be entered in any conventional manner, e.g., by transferring the information electronically from another system, by having the customer key it in or make selections as is often done in vending machines, by scanning purchased items, or by having a cashier or attendant input the information, for example, using a keypad or touch screen.

In 220, a query may be generated to inquire whether the customer wishes to play a game of chance. This query may displayed directly to the customer, or a cashier may be prompted to ask the customer.

In 222, the purchaser decides whether to play the game, and this information is received, e.g., by having the customer make a selection or by having the cashier enter this information. If the purchaser does not wish to play the game, the example procedure continues with 224, and the example procedure may be completed as a conventional purchase transaction. Otherwise, the example procedure may continue with 226.

In 226, the customer may be queried as to the amount they wish to wager in the game. In 228, the amount information may be received. The amount information may be directly input by the customer, e.g., by keying the amount in, or may be entered by a cashier or operator acting as instructed by the customer. It will be appreciated that 226 and 228 may be omitted if the game has a default amount. A default amount may be a fixed amount, e.g., 1$. The default amount may also be the change due the customer, e.g., the difference between the total cost of the customer's purchase and the next whole currency unit, for example next dollar or next Euro. The default amount may also be the total change due the customer. For example, if the customer tenders $20 for a $17.50 purchase, the default amount may be $2.50. It will be appreciated that the minimum or maximum amount played may be limited, e.g., by regulation or by the game sponsor. It will also be appreciated that the example procedure may be reordered, e.g., 220 and 222 may be combined with 226 and 228, by having the amount query serve as the "want to play" query, with a zero amount indicating that the customer does not desire to play the game.

In an alternative version of the example game that may be played separately or in addition to the example lottery game, the customer may choose numbers that the customer wishes to try and match against the lottery number. This choice may be made before the ticket is generated. The customer would then win if a predetermined function of the chosen numbers and the lottery numbers satisfies a predetermined matching condition.

In 229 payment may be received for both the original purchase and for the game. The purchase may by made by a cash tender, debit or credit card, or other payment systems. Steps may be included in the example ticket purchase procedure for management of purchase receipts, e.g., tracking cash receipts in a point of sale terminal, controlling cash drawer operations, submitting and validating credit card numbers for credit card purchases, etc.

In 230, a random number may be generated. This number may be taken from a predefined list of random numbers that is stored in protected storage, or may be generated using a secure pseudo random number generation scheme.

In 232, the random number, which may be normalized or scaled to an appropriate range if needed, may be used to index into a prize pool. The prize pool may contain a plurality of entries. An entry in the prize pool may indicate whether a given chance in the lottery game is a winner, and if so the base amount. The prize pool may also include an indication of whether or not the selected prize pool entry has previously been used. In one example embodiment of the present invention, each entry in the prize pool may be used only a single time. If the indexed entry of the prize pool has already been marked as used, a new number may be generated and the prize pool indexed repeatedly until an unused entry is located. Once the prize pool entry is located, the amount won by the ticket may be determined.

In one example approach to determining the size of the prize won by a particular ticket, the prize pool entry may contain a base prize amount. If the ticket was bought for a unit amount, the prize pool entry base prize amount may be awarded. If the ticket was bought for a fractional part of the price of a unit ticket, the prize may be scaled by multiplying the base prize amount by the fraction of the unit ticket price paid for the particular ticket. It will be appreciated that other approaches to determining the prize amount may be employed. For example, prizes may be awarded as a function of the total purchase price of goods and services purchased in the non-gaming transaction.

In 236, the selected entry in the prize pool may be marked to indicate that the entry has been used. Other information may also be recorded in the prize pool entry, for example, the date and time the prize pool entry was selected.

Figure 3:
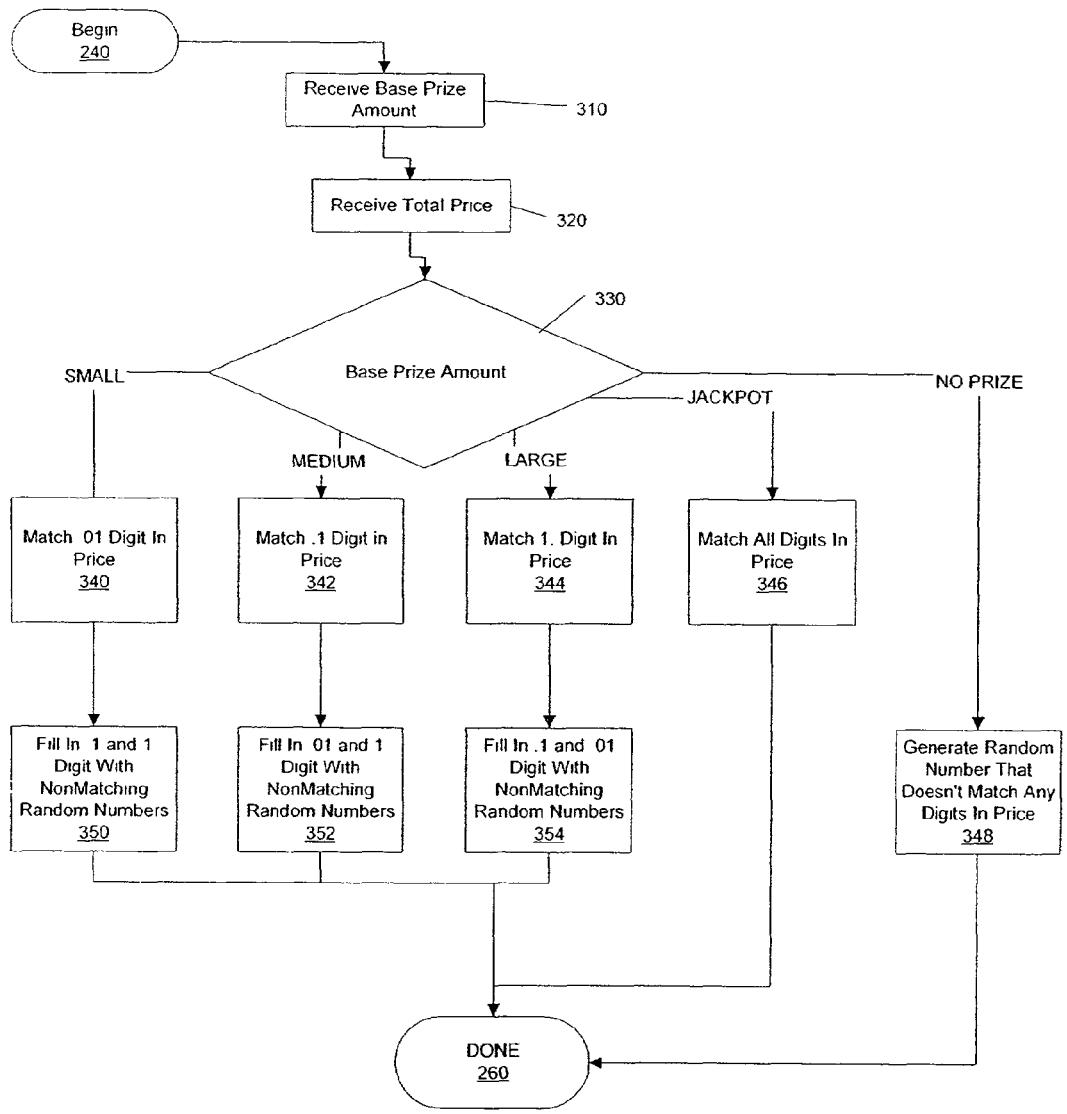
FIG. 3 illustrates an example procedure for generating a lottery number, according to an example embodiment of the present invention.

Once the selected entry in the prize pool and the proper prize have been determined, a receipt which serves as both a point of sale receipt and an instant win lottery ticket may be generated. Included on the ticket may be a lottery number, which may also need to be generated. In 240 a lottery number that produces the prize determined by selecting an entry from the prize pool may be determined. How the lottery number is chosen may depend on the rules of the game, and is described in detail in the discussion of FIG. 3 given below.

In 260, a receipt for the transaction that includes the lottery number may be output. The receipt may be printed using a conventional receipt printer on the point of sale terminal, or using other approaches. The receipt may contain both information related to the goods and services purchased and information related to the lottery game. The structure of an example receipt is also described in greater detail below, in the discussion of FIG. 5. Nonprinting methods of displaying lottery numbers and providing a customer purchase information may be provided, e.g., by displaying this information on a display or by including the information in a smart card or magnetic stripe card such as the one described in U.S. Pat. No. 4,764,666, issued Aug. 16, 1988. It will also be appreciated that the receipt and lottery number may be output on separate papers, as long as some provision is made for associating the receipt with a separate ticket, e.g., by putting the receipt number and/or transaction amount on the separate lottery ticket.

In 270, a log of tickets sold may be updated to reflect the sale of a ticket. Each entry in the log may include information about a lottery ticket that was sold. The log may include a receipt and/or ticket number, the amount that was paid for the ticket, when and where the ticket was purchased, the lottery number, the winning amount, and an indication of whether and/or when the ticket has been redeemed.

In 280, the status of the prize pool may be checked. If the prize pool is in a predetermined state, it may be refreshed to its initial state. For example, when the prize pool is more than a third used, and the total pay out is greater than a guaranteed minimum pay out per ticket, the prize pool may be reset.

In 290, the prize pool may be reset if a predetermined condition is met. It will be appreciated that the structure and reset behavior of the prize pool may be customizable, e.g., set by the sponsor of the game. For example if more than a predetermined percent of the entries have been marked as used, and if the guaranteed pay out has been met, the prize pool may be reset. Different prize pool reset strategies may serve different purposes. For example, resetting whenever the jackpot is won, may insure customer interest in winning the jackpot. Alternatively, resetting at random times may help prevent fraud by an attendant or cashier, who may track when a pool becomes particularly advantageous to play.

In an alternative example of the procedure discussed above, the lottery number may be randomly generated directly, without the use of a prize pool. Each digit in the lottery number may be randomly generated, or the random number may be randomly generated as a whole. Winning numbers for a particular ticket may be identified by determining if a predetermined function of the randomly generated lottery number and a transaction price satisfy a predetermined matching condition, e.g., if the lottery number matches the price any non-game item purchased, or if any digits of the lottery number match corresponding digits of the total price of non-game goods and services purchased. Although this alternative example approach may yield a lottery game with the correct statistical properties in the long run, it may fail to provide a guaranteed pay out over a particular time period. For example, due to random events, the game could pay out much more or much less than the expected amount in a given interval. A pay out which is too low may fail to meet regulatory requirements in some jurisdictions or may cause customers to lose interest in the game. A pay out which is too high may be undesirable to the retailer or sponsor. The original procedure described previously, with a prize pool of known size and composition, may allow the pay out over time to more carefully controlled. However, the alternative procedure of randomly generating the lottery number directly may be simpler to implement, e.g., in situations where pay outs vary according to transaction price information and/or the price of gaming chances.

It will also be appreciated that other activities may be included in the example game facilitation procedure. These additional activities may be related to either conventional point of sale terminal operations or lottery operations, e.g., inventory control, fraud detection, automatic couponing, sale of standard "drawing" type lottery tickets or conventional instant-win tickets, etc.

It will further be appreciated that the example game facilitation procedure may be provided using a computer-readable medium, e.g., a magnetic or optical disk, tape, or CD-ROM, having stored thereon instructions adapted to be executed by a processor, the instructions which, when executed, define a series of steps to be used to control the example procedure for facilitating the play of a lottery game. The example game facilitation procedure may be included in the example point of sale system. described below.

Example Lottery Number Generation Procedure

FIG. 3 illustrates an example procedure for generating a lottery number, according to an example embodiment of the present invention. The example lottery number generation procedure may be included as part of the example procedure for facilitating a lottery game that was illustrated in FIG. 2. The example lottery number generation may begin when a lottery number needs to be generated for use on a receipt, where the comparison of digits of the lottery number against a price determines whether the number is a winner. The example lottery number generation procedure may provided as part of 240, illustrated in FIG. 2. It will be appreciated the particular generation procedure described may be varied depending on changes in the rules for determining a winning number.

In 310, a base prize amount may be received. For illustration, the example assumes a game with four prizes, small, medium, large, and a jackpot. It will be appreciated that the example lottery number generation procedure may be altered to accommodate a different prize structure, e.g., for a game having a greater variety of winning conditions and prizes.

In 320, information indicating the transaction price may be received. This number is the number that needs be matched, either digit by digit, or as a whole, in order for the ticket to be a winner in the example game rules.

In 330, the category of prize may be used to decide which digits of the transaction price will be matched. For a small prize, the example lottery number generation procedure may continue with 340, for a medium prize with 342, for a large prize with 344, for the jackpot with 346, and if no prize is won with 348.

In 340, the "0.01" digit of the transaction price may be matched, by setting the least significant digit of the lottery number to match the "0.01" digit of the transaction price. In 342, the "0.1" digit of the transaction price may be matched, by setting the second least significant digit of the lottery number to match the "0.1" digit of the transaction price. In 344, the first whole digit of the transaction price may be matched, by setting third least significant digit of the lottery number to match the first whole digit of the transaction price. In 346, all three digits of the transaction price may be matched, by setting the all three digits of the lottery number to match the corresponding digits of the transaction price.

In 348, random digits may be generated for each digit of the lottery number. If any digit matches a corresponding digit of the transaction price, it may be replaced by a non-matching digit. Non-matching digit may be chosen by drawing additional random numbers until a non-matching digit is received. Alternatively, the matching number can just be adjusted up or down, although this may cause more "close to winning" lottery numbers to be produced, possibly making the lottery numbers to appear less random. This may be desirable, if customers are encouraged to play again after having a "near miss".

In 350, the 0.1 and first whole digits of the lottery number may be set to random digits. If either digit matches the corresponding digit of the transaction price, it may be replaced by a non-matching digit. In 352, the 0.01 and first whole digits of the lottery number may be set to random digits. If either digit matches the corresponding digit of the transaction price, it may be replaced by a non-matching digit. In 354, the 0.1 and 0.01 digits of the lottery number may be set to random digits. If either digit matches the corresponding digit of the transaction price, it may be replaced by a non-matching digit.

When the example lottery number generation procedure is completed, the lottery number information may be used in printing a lottery ticket or receipt containing the lottery number and other lottery information, e.g., in 260 as illustrated in FIG. 2.

It will be appreciated that the example lottery number generation procedure has been illustrated using a three digit transaction price and three digit lottery number. The example lottery number generation procedure may be modified to accommodate different length lottery numbers and prices. The example lottery number generation procedure may also be easily modified to use other approaches for determining winners and prize levels, e.g., prizes for matching two digits, prizes for matching any item price rather than the total price, etc. It will be appreciated that different matching schemes may be used, e.g., matching tenths or hundredths may be unsuitable in a Yen-based game, as contrasted with a dollar- or Euro-based game, so other types of matching may be used.

In an alternative game that may be provided, where the customer pre-chooses a number or sequence of numbers to match against the lottery number, a similar lottery number generation procedure may be employed. However, in the alternative game, winning tickets will be generated with lottery numbers that match the customer chosen numbers in the appropriate digit positions. It will be appreciated that both a customer chosen number and transaction price based lottery number matching game may be played simultaneously, e.g., a winning ticket has a lottery number that matches either the customer chosen number or the transaction price. This gives the customer two chances to win, possibly increasing customer interest. However, the same lottery number generation procedure may be employed, with the modification that losing tickets are generated so that do not match either the customer chosen number or the transaction price.

It will further be appreciated that the example lottery number generation procedure may be provided using a computer-readable medium, e.g., a magnetic or optical disk, tape, or CD-ROM, having stored thereon instructions adapted to be executed by a processor, the instructions which, when executed, define a series of steps to be used to control the example procedure for generating a lottery number. The example lottery number generation procedure may be included as part of the point of sale systems described below.

Example Ticket Authentication and Payment Procedure

Figure 4:
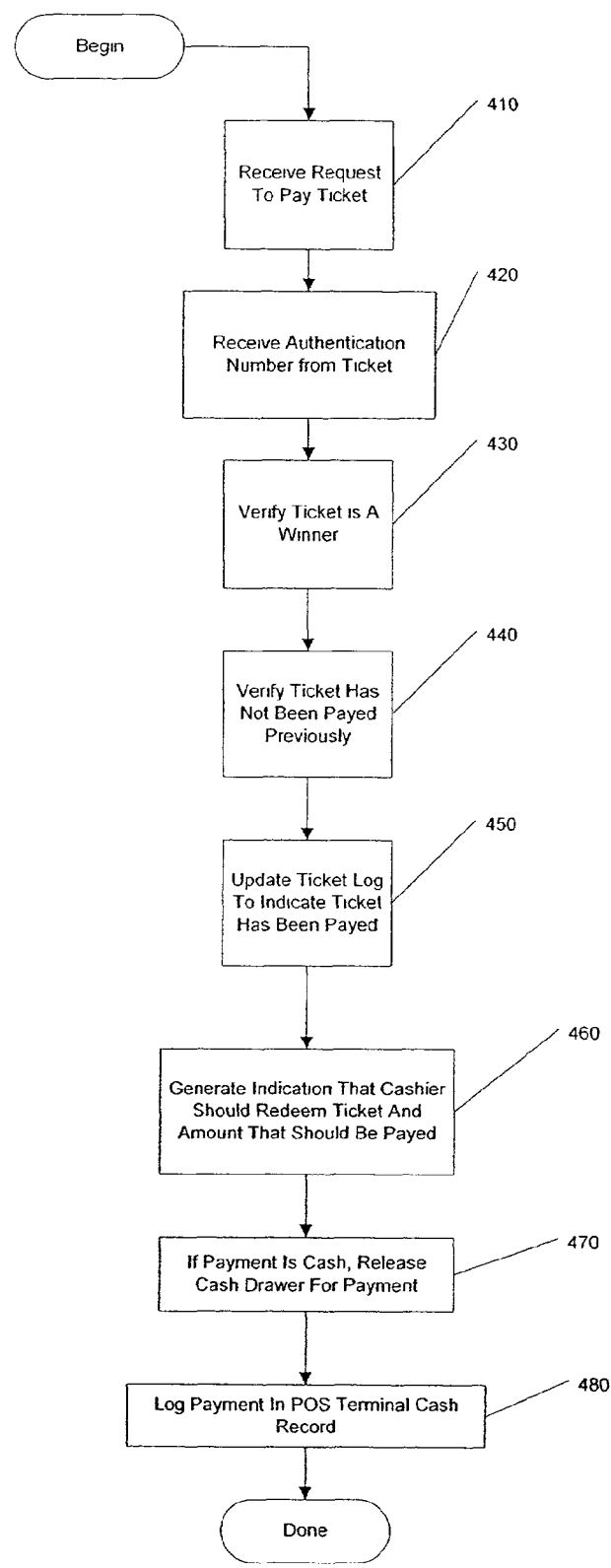
FIG. 4 illustrates an example procedure for authenticating and paying a winning ticket, according to an example embodiment of the present invention.

FIG. 4 illustrates an example procedure for authenticating and paying a winning ticket, according to an example embodiment of the present invention.

In 410, a request to redeem a ticket may be received. The ticket may be tendered, e.g., by turning in to a cashier or attendant, or with an automated point of sale system by inserting it into an automatic reader.

In 420, the authentication number from the ticket may be received. The number may be typed in by a cashier or attendant, or may be scanned, e.g., by using a bar code scanner.

In 430, whether the ticket is a winning ticket may verified. This information may be determined by looking up the authentication number or the ticket number in a log that includes information identifying the previously sold tickets as a winners or losers. Alternatively, this information may be encoded in the authentication number, e.g., by using a public key encryption system, as is done in some conventional instant win ticket game systems.

In 440, whether the tendered ticket has been previously tendered may be determined. This may be determined, for example, by examining a "redeemed" field in the lottery ticket log to verify that the tendered ticket has not been previously redeemed.

In 450, the ticket log may be updated to reflect the fact that the tendered ticket has been tendered for redemption.

In 460, an indication may be provided that the cashier should redeem the tendered ticket, e.g., by displaying a prompt on a point of sale system display. Alternatively, in an automated system, the ticket authentication procedure may initiate a ticket payment procedure automatically, once the ticket has been validated. The amount the cashier should pay out on the ticket may be determined. For example, this information may be read from the ticket log. The amount to be paid may be displayed to the cashier, and/or directly to the person redeeming the ticket.

In 470, if payment for a tendered ticket is in cash at a point of sale terminal, the authentication and payment procedure may cause a cash drawer in the point of sale terminal to be released, allowing a cashier or attendant to pay the person tendering the ticket. In 480, if a cash payment is made to the person tendering the ticket, e.g., from a point of sale terminal, the cash payment may be logged in a cash record for the point of sale terminal.

When the person redeeming the ticket has been paid, the example authentication and payment procedure may be completed.

It will be appreciated that the example procedure for authenticating and paying a lottery ticket may be provided using a computer-readable medium, e.g., a magnetic or optical disk, tape, or CD-ROM, having stored thereon instructions adapted to be executed by a processor, the instructions which, when executed, define a series of steps to be used to control the example procedure for authenticating and paying a lottery ticket. The example procedure may be provided as part of a point of sale system, such as the systems described below.

It will be appreciated that other actions may be included in the example procedure for authentication and payment. For example, electronic payment may require different procedures. Extra security measures may be provided for payment of tickets that are large winners, or that are old, or that were sold at different establishments than the one redeeming the ticket.

Example Game Receipt

Figure 5:
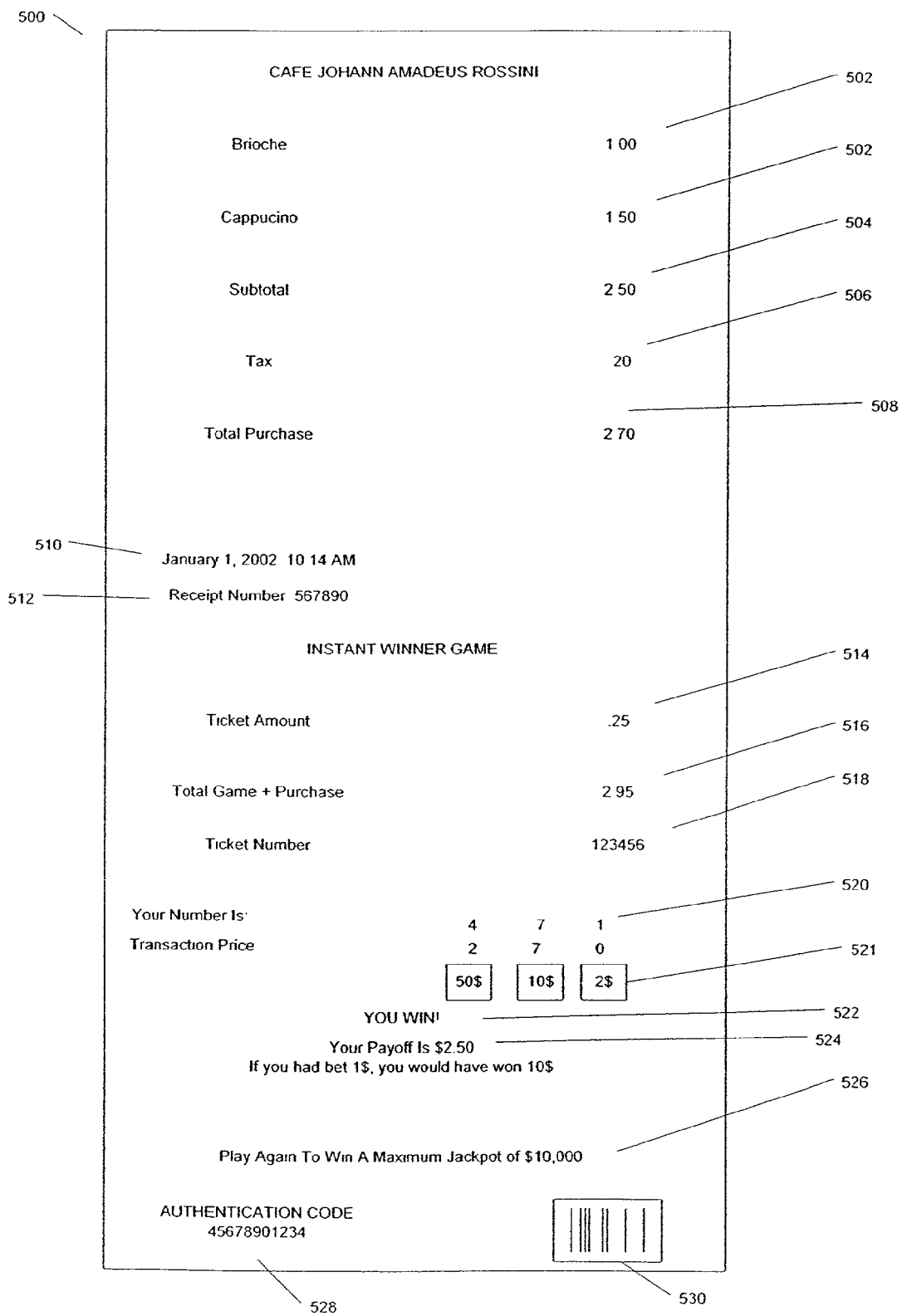
FIG. 5 illustrates an example receipt, according to an example embodiment of the present invention.

FIG. 5 illustrates an example receipt, according to an example embodiment of the present invention. The example receipt 500 may be printed on conventional receipt paper, or may be printed on other media to enhance security.

The example receipt 500 may include any fields found on a conventional point of sale terminal sales receipt that is unrelated to gaming purchase. The example receipt 500 may include a list of entries 502 with prices indicating goods or services that have been purchased. Each entry 502 may include a description of an item as well as its price. Additional fields may be included in an entry 502, e.g., a quantity field to allow multiple purchases of the same type of item to be output as a single entry. The example receipt 502 may include a subtotal 504, indicating the total pre-tax price of the goods and services purchased. The example receipt may include a tax entry 506 indicating the sales of VAT tax on the goods or services purchased. The example receipt 502 may include a grand total entry 508 indicating the total price of the goods and services purchased including tax. The example receipt may include a date and time stamp 510 and a receipt number 512 that may uniquely identify each receipt by a point of sale system.

The example receipt 500 may also include a section that is related to the playing of a game of chance. The example receipt 500 may include a ticket amount entry 514 indicative of the amount the customer has chosen to wager in the came. The example receipt 500 may include an aggregate purchase and game amount 516 that indicates the total costs of the purchases and the amount wagered in the game. The example receipt 500 may include a ticket number 518 that may be used to identify all gaming tickets sold. The ticket number 518 may be different that the receipt number 512, which may be used for all receipts, including receipts where the customer does not play the game. It will be appreciated that, alternatively, the ticket number may be omitted and the receipt number used in its place, although then a continuous series of ticket numbers may not be produced, because not all receipts are used for gaming.

The example receipt 500 may include a lottery or gaming number 520. The number of digits and range of the lottery number 520 may vary depending on the exact rules of the game, e.g., the lottery number may have the same number of digits as the total purchase price 508. If the game involves matching the lottery number against another number, e.g., a transaction price such as the total price, the lottery price 520 may be displayed adjacent to the lottery number, as illustrated. If the prize depends on which digits match between the lottery number and transaction price, the prize for matching a particular pair of digits may be displayed with the pair of digits, as shown in 521. This allows the customer to view potential prizes that have or might be won. In a game where the price varies, the displayed potential prizes may be the full prize from a unit sized ticket, as shown, or may be pro-rated by the fraction of the unit price that was paid.

The example receipt 500 may include an indicia or message 522 that indicates to the purchaser that the receipt is a winner. If the example receipt is a winning ticket, it may include an indication of the amount won 524. In a game that is not always played for a unit or standard amount where the prize is pro-rated by the amount played, the amount won indicia 524 may also include information about the prize that would have been won had the game been played for full price.

The example receipt 500 may include an advertisement 526 that indicates the maximum possible game payoff. This advertisement may help induce players to want to play the game again in the future. The example receipt 500 may include an authentication code 528. The authentication code may be a number generated that encodes information about the ticket, including for example a public key encryption of when it was sold, for how much, and whether it was winner. This information may be used to authenticate the ticket when it is redeemed. A machine readable authentication code 530 may also be provided, for example as a bar code or two-dimensional bar code.

It will be appreciated that other information may be included in the example receipt, e.g., the identity of the agent selling the ticket, an identification number for the point of sale terminal that the ticket was sold from, additional advertising information, coupons, etc. Rules of the game and/or legal disclaimers may be printed on the ticket, e.g., on the reverse side. Additional security and authentication information may also be added, e.g., multiple layer, special marks, etc.

Example Stand Alone Point of Sale System

Figure 6:
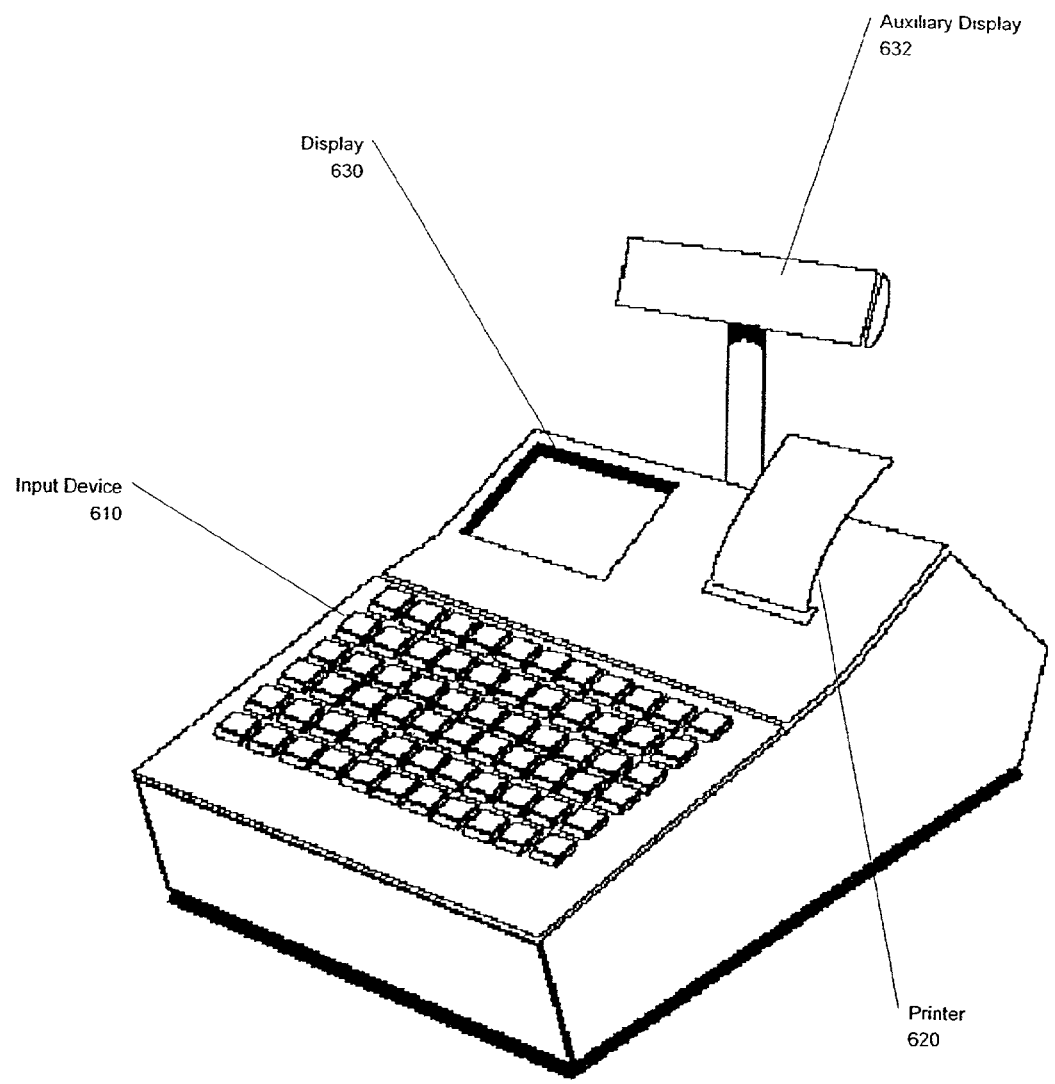
FIG. 6 illustrates an external view of an example stand alone point of sale system, according to an example embodiment of the present invention.

FIG. 6 illustrates an external view of an example stand alone point of sale system, according to an example embodiment of the present invention. Externally, the example stand alone point of sale system may be identical to a conventional point of sale terminal.

The example stand alone point of sale system may include one or more input device 610. The input device may be a keyboard, keypad, touch screen, or other conventional input device. It will be appreciated that other input devices may also be included in the example stand alone point of sale system, e.g., a bar code scanner, a separate keypad input devices for use by a customer, and/or a device for reading magnetic strip cards or smart cards.

The example stand alone point of sale system may include a printing device 620. The printing device 620 may be used for printing receipts, e.g., a conventional laser or dot matrix printer may be used to print on conventional roll of receipt paper which is torn off and given to a customer. It will be appreciated that other forms of printing and other forms of receipts may be provided.

The example stand alone point of sale system may include a display device or monitor 630, e.g., for use by a cashier. It will be appreciated that multiple output devices may be included, e.g., a separate display may be provided for a customer. For example, an auxiliary display device 632 may be provided for display of information that should be easily readable by a customer.

Figure 7:
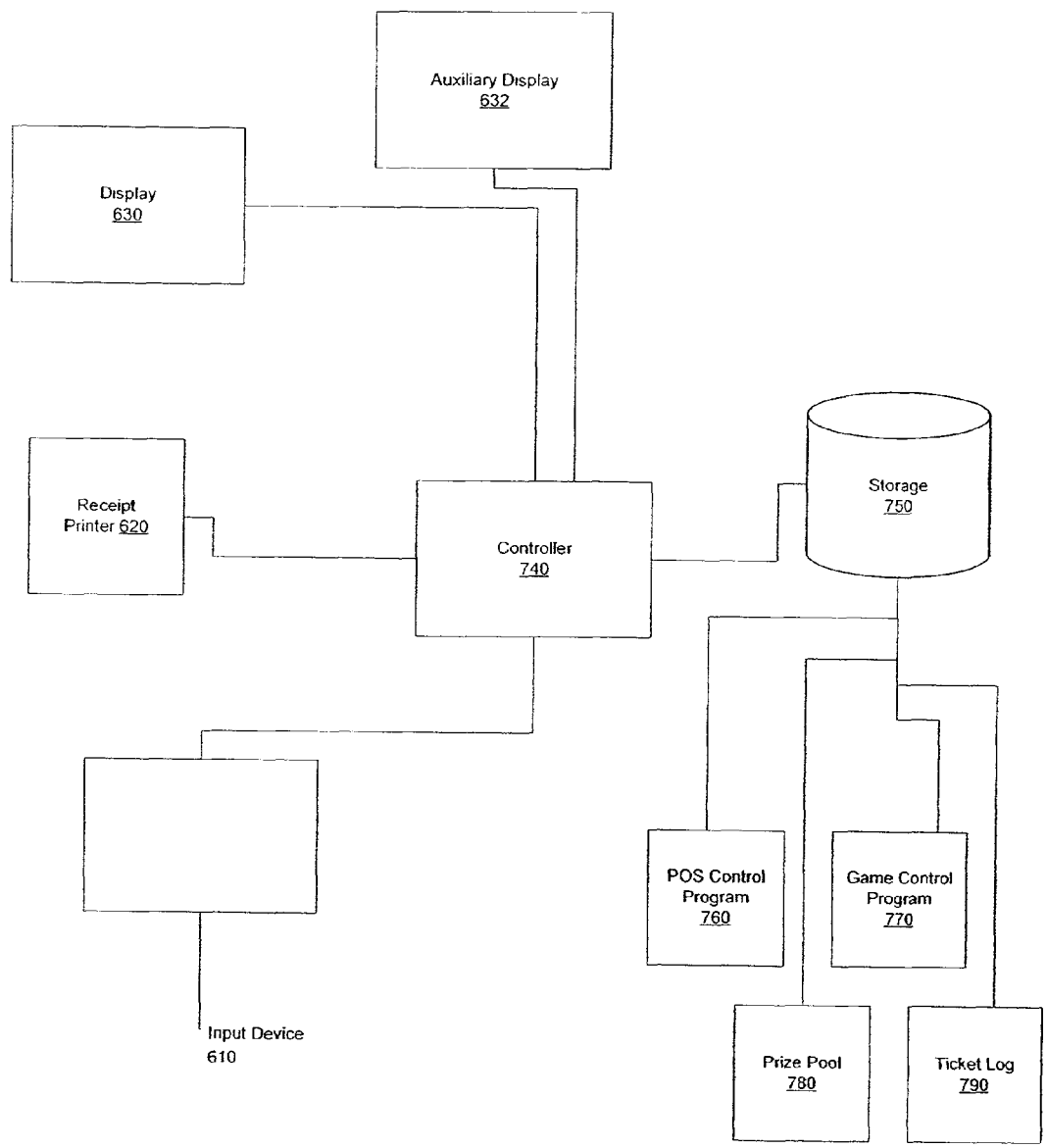
FIG. 7 illustrates a logical view of an example stand alone point of sale system, according to an example embodiment of the present invention.

FIG. 7 illustrates a logical view of an example stand alone point of sale system, according to an example embodiment of the present invention. The example stand alone point of sale system may include one or more input devices 610, one or more printing devices 620, and one or more or display devices or monitors 630 and 632.

The example stand alone point of sale system may include a controller 740. The controller may include a conventional microprocessor or custom designed control circuitry. The controller may be in communication with the input device 610, printing device 620, and display devices 630 and 632. The controller 740 may be used to control the operation of the other components of the example point of sale system, e.g., by executing a control program that facilitates the play of a game chance, and by executing a control program to control conventional point of sale operations. The controller may be configured to control the stand alone point of sale system in carrying out procedures for facilitating the play of a lottery game, generating lottery numbers, and authenticating and paying winning lottery tickets, as were described above.

The example stand alone point of sale system may include a storage subsystem 750. The storage subsystem may include RAM, ROM, disk, optical disk, flash memory, or other conventional storage media. The storage subsystem may be a separate component from the controller 740, or may be included as part of the controller 740.

Stored in the storage subsystem 750 may be programs and data used to control or facilitate conventional point of sale operations, as well as programs and data used to control or facilitate the play of lottery games. A POS Control Program 760 may be used to control conventional point of sale operations. A game control program 770 may be used to control the sale and redemption of gaming chances in the procedures for playing and facilitating the play of a lottery game that were described previously, e.g., receipts for conventional purchases that serve as a ticket for an instant-win lottery game. A prize pool 780 may contain information related to a pool of chances that may be sold in the lottery game. Each entry in the prize pool may correspond to a single chance that may be sold in the lottery game. Each entry in the prize pool may also contain an indication of whether the particular chance is a winner, a prize amount, as well as information about when and whether a particular chance has been sold. The storage subsystem may also include a ticket log 790, that may be used to record the sale of tickets and facilitate procedures for redeeming tickets.

It will be appreciated that the programs, prize pool, and ticket log need not be located in a particular storage subsystem, e.g., they could reside directly on the controller. It will also be appreciated that other elements may be included in the example stand alone point of sale system, e.g. a cash drawer and cash drawer operations control program, security, auditing capabilities, etc.

Example Locally Networked Point of Sale System

Figure 8:
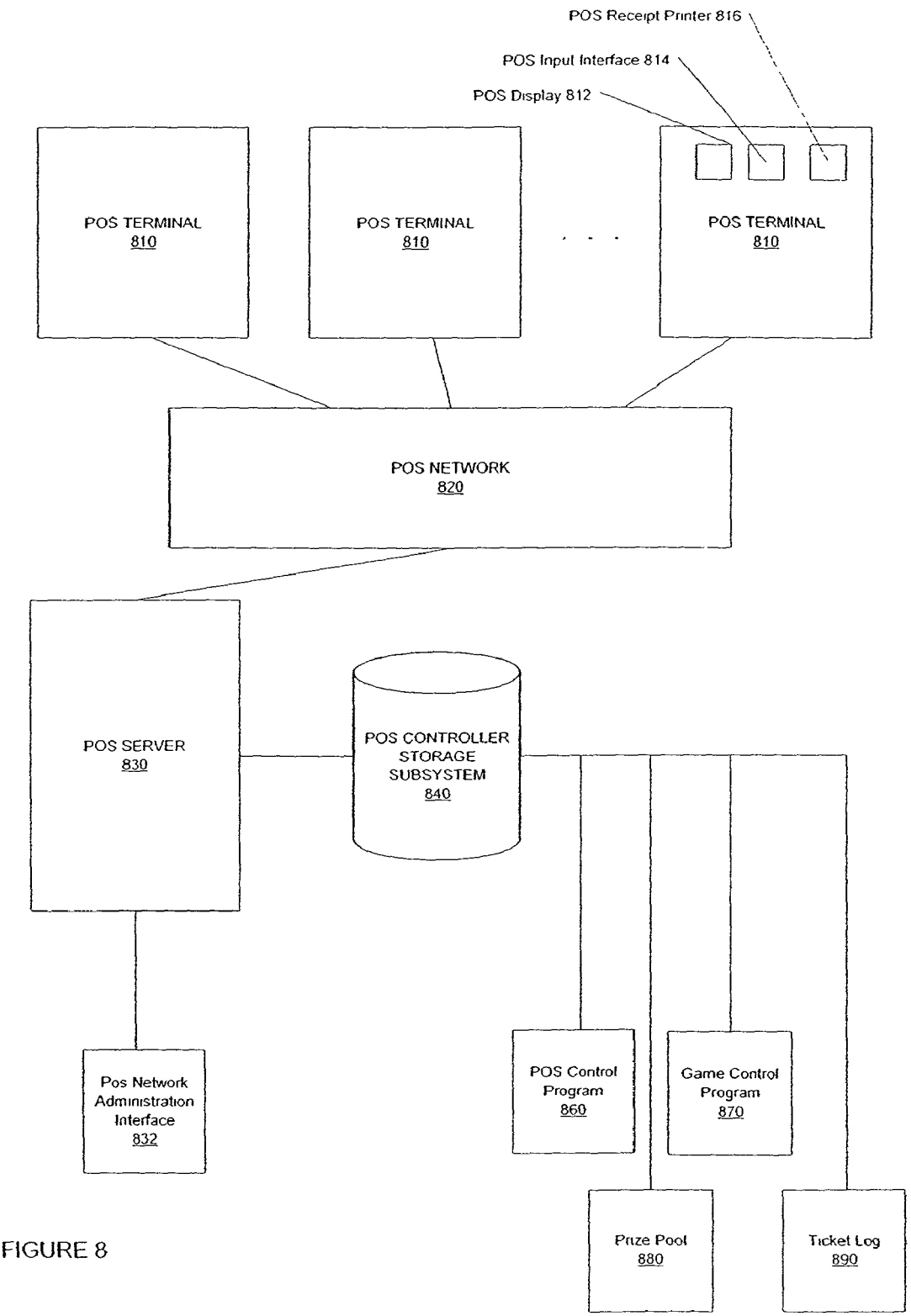
FIG. 8 illustrates a locally networked point of sale system, according to an example embodiment of the present invention.

FIG. 8 illustrates a locally networked point of sale system, according to an example embodiment of the present invention. The locally networked point of sale system is an alternative system capable of facilitating the play of the lottery game described above, the sale of tickets for the game, the generation of lottery numbers, and the authentication and payment of winning tickets. The locally networked point of sale system may include a plurality of point of sale terminals 810.

The point of sale terminal 810 may include a display device 812, and input device 814, and a receipt printer 816 These components are similar to those found in the stand alone point of sale terminal previously described. The point of sale terminals 810 may be connected via a local point of sale network 820 to a point of sale server 830. Any conventional network hardware and protocol may be employed, e.g., TCIP/IP, Ethernet, FDDI, or other networking approaches. The point of sale server 830 may include a controller that may be used to control the operations of the point of sale terminals. Some of the functionality of the stand alone point of sale terminal describe previously may be centralized for a group of POS terminal in the point of sale server 830. For example, the point of sale server may control the procedures used to facilitate the play of the lottery game, such as ticket sales, lottery number generation, access to the prize pool, and ticket authentication and redemption. It will be appreciated that some of these capabilities may still be provided locally on the individual point of sale terminals 810.

A POS network administration interface 832 may be connected to the POS server, or directly to the POS network. This interface, which may be provided as a terminal or workstation, maybe used to provide access to the system for various administrative functions, such as system and network administration, audit, fraud detection, inventory management, etc.

The point of sale server may include or be connected to a POS controller storage subsystem 840. Stored in the POS server storage subsystem may be programs for control of conventional POS terminal operations 860. Also stored in the storage subsystem may be programs for control of game operations 870, such as the generation and redemption of lottery tickets using the procedures described previously. The storage subsystem may also include a prize pool 880 that may be used to facilitate the play of a game of chance, e.g., the prize pool may be used in the generation of lottery numbers and determination of prizes for sold tickets. The storage subsystem may also include a ticket log 890, that may be used to record the sale of tickets and facilitate procedures for redeeming tickets.

It will be appreciated that the programs, prize pool, and ticket log are not necessarily located in a particular storage subsystem, e.g., they could reside directly on the POS server. Some of the functions and/or items stored in the POS controller database might be moved to or replicated on individual POS terminals. It will also be appreciated that other architectures may be employed for the networked POS system, e.g., control may be distributed across the POS terminals, rather than centralized in a central server, some POS terminals may be controllers with other POS terminals slaved to them, etc.

Example Distributed Point of Sale System

Figure 9:
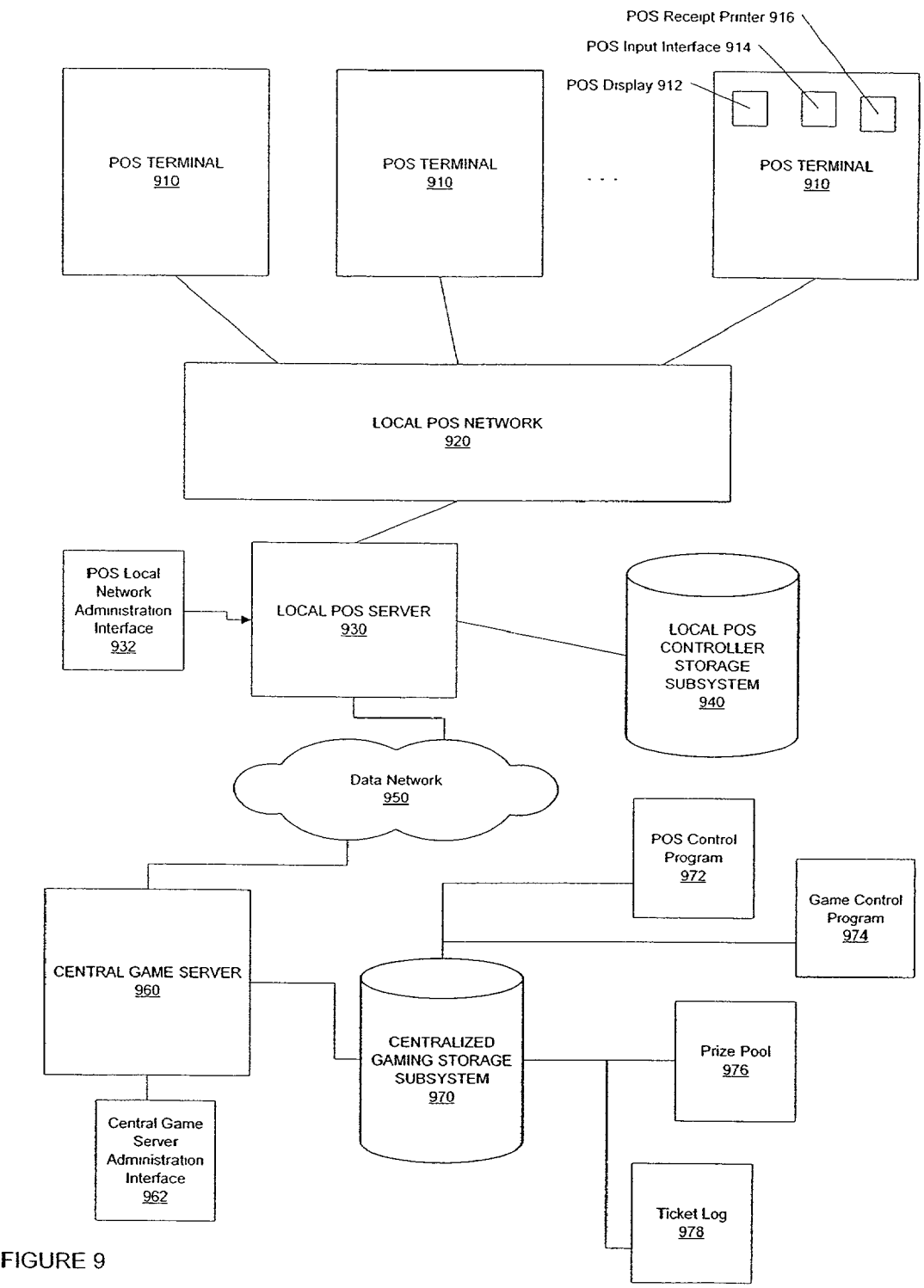
FIG. 9 illustrates a remotely networked point of sale system with a game server, according to an example embodiment of the present invention.

FIG. 9 illustrates a remotely networked point of sale system with a game server, according to an example embodiment of the present invention. The example system illustrated in FIG. 9 may provide operations for controlling the sale and redemption of game tickets centralized, possibly at a remote location from where POS terminals are located.

The distributed POS system may include POS terminals 910. These terminals may all be at different locations, or multiple terminals may be located at the same location. Individual POS terminals may include POS displays 912, POS input interfaces 914 such as keypads or touch screens, and a receipt printer 916. The POS terminals may be connected via a local POS network 920 to a local POS controller 930. The local POS server 930 may be used to manage the operation of the POS terminals 910. A POS network administration interface 832 may be connected to the POS server 930, or directly to the POS network 920. This interface, which may be provided as a terminal or workstation, may provide access to the system for various administrative functions, such as system and network administration of the local POS network.

Gaming operations may be centralized at a central game server 960. The central game server 960 may be connected to the local POS server 930 via a data network 950. The data network 950 may include secure internet connections, dial-up connections, private lines, or other conventional remote data connections. A central game server administration interface 962 may be connected to the central game server, or directly to the data network. This interface, which may be provided as a terminal or workstation, may provide access to the system for various administrative functions, such as system and network administration. It may also be configured to provide administrative access for the control of gaming operations, such as provisioning, audit, and fraud detection.

The central game server 960 may be connected to or include a central game storage subsystem 970. This central game storage subsystem may include a POS control program 972. The POS control program may be used to control conventional point of sale terminal operations. The central game storage subsystem may include a game control program 974. The game control program 974 may be used to control gaming operations such as the sale lottery tickets, the generation of lottery numbers, and the authentication and redemption of winning ticket. The central game storage subsystem may include a prize pool 976. The prize pool 976 may be used to determine whether purchased chances in the lottery game are winners, and if so their prize value. The central game storage subsystem may also include a ticket log 978. The ticket log 978 may include information on lottery tickets that have been sold, and whether and when sold tickets have been redeemed.

The central game server 960 may be configured to control or facilitate gaming operations and procedures, such as the sale of tickets, generation of lottery numbers, authentication and redemption of winning tickets, etc. When a customer requests to purchase a gaming ticket at a POS terminal 910, the request may be forward via the local POS network 920 to the local POS controller 930. The local POS controller may in turn forward the request via the data network 950 to the central game server 960.

It will be appreciated that other architectures may be employed for the distributed point of sale system. For example, additional networking capabilities may be provided in the Point of Sale Terminals so that they connect directly via the data network to the central game server, without use of a local POS network or POS controller. Partial or complete copies of the prize pool, ticket log, or game control programs may be located in directly on the POS terminals, or on the local POS server, rather than being completely centralized.

Example Prize Pool

Figure 10A:
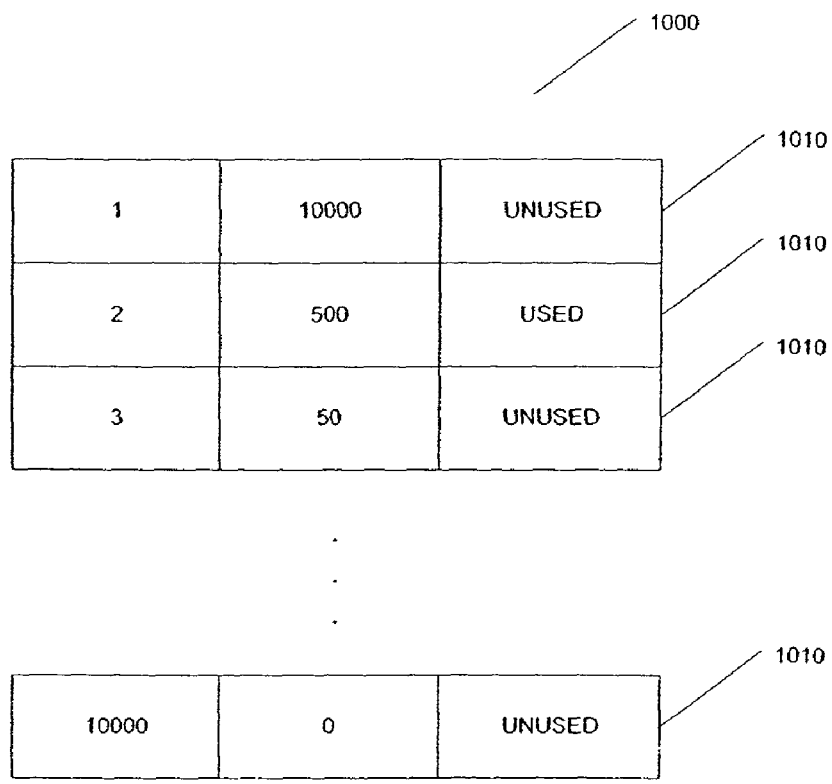
FIG. 10$a$ illustrates an example prize pool, according to an example embodiment of the present invention.

FIG. 10a illustrates an example prize pool, according to an example embodiment of the present invention. Although the example prize pool 1000 is illustrated as a table or array, it will be appreciated that other conventional data structures may be employed, e.g., a relational database, a linked list, a tree, a programmer defined object, etc. The example prize pool 1000 may include a plurality of entries 1010. Each entry 1010 may correspond to a chance in the game that may be sold to a customer.

Figure 10B:
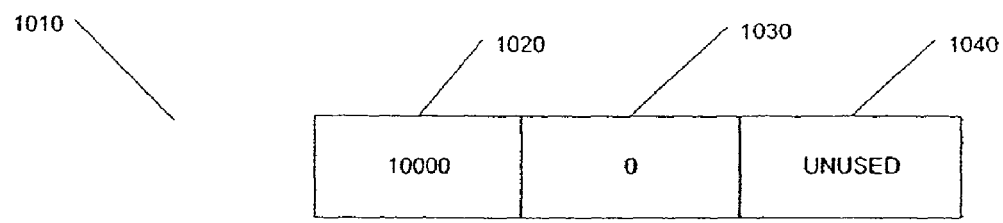

FIG. 10b illustrates an example entry 1010 from the example prize pool, according to an example embodiment of the present invention. The example entry 1010 may include a plurality of fields with information about chances in the example game. Each entry may include a number or index 1020 that identifies a chance in the game and the prize entry. Each entry 1010 may also include an amount 1030, that indicates the base amount that will be won by the chance. The entry 1010 may also include a "used" field 1040 that is indicative of whether the particular chance has been sold or not. Other information may also be included in the 1010, for example information on when or where the chance was sold, the amount the chance was sold for, etc. It will also be appreciated that different data structures may be used for the entry, for example it could be a linked list entry, or the information could be spread over multiple tables in a relational database with a common index.

It will be appreciated that, by varying the size and composition of the prize pool, the properties of the game may be varied. The average probability that tickets are winners may be increased by increasing the number of winning entries in the prize pool. The average pay out for tickets may be increased by increasing the number of winning entries, or by increasing the pay out for some tickets. Variability of the game may be increased by having a few large prizes.

Example Ticket Log

FIG. 11a illustrates an example ticket log, according to an example embodiment of the present invention. The example ticket log 1100 may be used to keep track of receipts with lottery numbers or other lottery tickets that have been sold, as well as whether the sold tickets have been redeemed. The example ticket log may include a plurality of entries 1110, each entry corresponding to a receipt that has included the sale of a gaming chance to a customer. It will be appreciated that the ticket log, although illustrated as a table, may be stored in a variety of conventional data structures, e.g., as a linked list, or a custom-designed object. It will also be appreciated that the ticket log information may be incorporated in other data structures, rather than as a separate log, e.g., if the prize pool were stored in a relational database, the information may be stored in the prize pool may be split in multiple tables in a way that allows the information to be accessed as a log using conventional database queries.

FIG. 11b illustrates an example entry 1110 from the example ticket log, according to an example embodiment of the present invention. The example entry 1110 may include a plurality of fields that provide information about a particular ticket that has been sold. The example entry 1110 may include a ticket number 1120 that uniquely identifies a ticket that has been sold. The example entry 1110 may include a price field 1130 that indicates the amount that was wagered when the ticket was purchased. The example entry 1110 may include a time field 1140 that may indicate the time the corresponding ticket was sold. The example entry 1110 may include a prize field 1150, which may indicate the base amount that would be won on the ticket, if the ticket were purchased as a full price ticket. If the game allows the purchase of fractional chances, the prize field 1150 may be unadjusted, in which case the actual prize to be paid may be determined by multiplying the fraction paid for the chance times the base prize amount. Alternatively, the prize field 1150 may indicate the actual prize which will be paid. The example entry may include a redemption field 1160 that may indicate whether the ticket has been redeemed, and if it has when the redemption occurred. It will be appreciated that the ticket log entry may include other fields not shown, e.g., an indication where or by whom the ticket was sold or redeemed, the value of the authentication code for the ticket, the lottery number or price information for the ticket, etc.

Modifications

In the preceding specification, the present invention has been described with reference to specific example embodiments thereof. It will, however, be evident that various modifications and changes may be made thereunto without departing from the broader spirit and scope of the present invention as set forth in the claims that follow. The specification and drawings are accordingly to be regarded in an illustrative rather than restrictive sense.

The invention claimed is:

1. A method of playing a game of chance, comprising:
   making a purchase transaction having an associated transaction price at a point of sale terminal;
   as part of completing the purchase transaction, receiving a lottery number; and
   conditioned upon a comparison between the digits of the lottery number and the digits of the associated transaction price satisfying a matching condition determined by the rules of the game, receiving a prize.

2. The method of playing a game of chance of claim 1, further comprising:
   receiving a receipt for the purchase transaction from the point of sale terminal, the receipt including the associated transaction price.

3. The method of playing a game of chance of claim 2, wherein the receipt further includes the lottery number.

4. The method playing a game of chance of claim 2, further comprising:
   tendering the receipt for the prize; and
   responsive to an authentication code included on the receipt indicating the receipt is a valid winning ticket, receiving the prize.

5. The method of playing a game of chance of claim 1, further comprising:
prior to receiving the lottery number, selecting a game price.

6. The method of playing a game of chance of claim 5, wherein the prize is proportional to the game price.

7. The method of playing a game of chance of claim 1, further comprising:
requesting to play the game of chance using a default value for a game price.

8. The method of playing a game of chance of claim 1, wherein the associated transaction price is the price of any one item purchased in the purchase transaction.

9. The method of playing a game of chance of claim 1, further comprising:
tendering a payment amount greater than a total price of the purchase transaction; and
requesting to play the game of chance using a game price equal to the difference between the payment amount and the total price of the purchase transaction.

10. The method of playing a game of chance of claim 9, wherein the prize is proportional to the game price.

11. The method of playing a game of chance claim 1, further comprising:
conditioned upon a second comparison between the digits of the lottery number and the digits of the associated transaction price meeting a second matching condition determined by the rules of the game, receiving a jackpot prize, the jackpot prize being larger than the prize.

12. The method of playing a game of chance claim 6, further comprising:
receiving an indication of the value of a jackpot prize, even if the jackpot prize has not been won.

13. The method of playing a game of chance claim 1, wherein the prize is equal in value to the associated transaction price.

14. The method of playing a game of chance of claim 1, wherein the associated transaction price is the total price of all items purchased in the purchase transaction excluding a game price.

15. The method of claim 1, wherein the associated transaction price is the total price of all items purchased in the purchase transaction including a game price.

16. The method of claim 1, wherein a probability of winning a prize increases with the associated transaction price.

17. A method of playing a game of chance, comprising:
executing, at a point of sale terminal, a transaction that includes a purchase of at least one item other than a lottery number, the purchase being in consideration of payment of a transaction price;
receiving a lottery number as part of the purchase transaction; and
conditioned on a comparison between the digits of the lottery number and the digits of the transaction price satisfying a matching condition determined by the rules of the game, receiving a prize having a prize amount;
wherein the prize amount increases with the associated transaction price.

18. A method of playing a game of chance, comprising:
making a purchase transaction having an associated transaction price at a point of sale terminal;
receiving a lottery number; and
conditioned on a predetermined function of the lottery number and the transaction price satisfying a predetermined matching condition, receiving a prize have a prize amount;
wherein the predetermined function of the lottery number and the associated transaction price satisfies the predetermined matching condition if at least one digit of the lottery number is the same as a digit in the corresponding position of the associated transaction price.

19. A method of playing a game of chance, comprising:
making a purchase transaction having an associated transaction price at a point of sale terminal;
receiving a lottery number; and
conditioned on a predetermined function of the lottery number and the transaction price satisfying a predetermined matching condition, receiving a prize have a prize amount;
wherein the predetermined function of the lottery number and the associated transaction price satisfies the predetermined matching condition if every digit in the lottery number is the same as a digit in a corresponding position of the associated transaction price.

20. A method of playing a lottery game, comprising:
making a purchase transaction having a total transaction price;
requesting to play the lottery game;
tendering an amount sufficient to cover a lottery game price and the total transaction price;
receiving a receipt for the transaction, the receipt including
the total transaction price,
the lottery game price,
a lottery number having the same number of digits as the total transaction price,
a prize amount,
a jackpot prize amount, and
an authentication code;
tendering the receipt;
conditioned on at least one of the digits in the lottery number matching a corresponding digit in the total transaction price, receiving a prize having the prize amount; and
conditioned on every digit in the lottery number matching a corresponding digit in the total transaction price, receiving the jackpot prize.

21. A method for facilitating the play of a game of chance, comprising:
receiving information indicative of a transaction price for a non-lottery purchase transaction made at a point of sale terminal;
as part of completing the purchase transaction, providing a lottery number; and
conditioned on a comparison between the digits of the transaction price and the digits of the lottery number satisfying a matching condition determined by the rules of the game, awarding a prize.

22. The method for facilitating the play of a game of chance of claim 21, further comprising:
printing a receipt for the purchase transaction, the receipt including
the transaction price, and
the lottery number.

23. The method of facilitating the play of a game of chance of claim 22, further comprising:
receiving a request to redeem the receipt for the prize;
verifying that the receipt is a valid winning ticket;
verifying that the receipt has not been previously redeemed for the prize;
responsive to verifying that the receipt is a valid winning ticket and has not previously been redeemed, providing an indication that the ticket should be redeemed; and
recording that the receipt has been redeemed.

24. The method of facilitating the play of a game of chance of claim 22, further comprising:
receiving information indicative of an amount wagered in the game of chance,
wherein the receipt further includes an indication of the amount wagered in the game of chance.

25. The method of facilitating the play of a game of chance of claim 24, further comprising:
conditioned on the receipt being a winning ticket, determining the amount of the prize as a function of the amount wagered.

26. A method of facilitating the play of a game of chance, comprising:
receiving information indicative of a transaction price for a purchase transaction from a point of sale terminal;
selecting an entry in a prize pool;
determining whether a lottery number should be a winner based on information contained in the prize pool entry;
responsive to determining that the information in the selected prize pool entry indicates that the lottery number should be a winner, generating the lottery number so that a predetermined function the transaction price and the lottery number satisfies the predetermined matching condition; and
providing the lottery number to a player at the point of sale terminal, wherein whether the lottery number is a winner is conditioned on whether the predetermined function that includes a comparison between the transaction price and the lottery number satisfies the predetermined matching condition.

27. The method of facilitating the play of a game of chance of claim 26, further comprising:
responsive to the information in the selected prize pool entry indicating that the lottery number should not be a winner, generating the lottery number so that the predetermined function of the transaction price and the lottery number does not satisfy the predetermined matching condition.

28. The method of facilitating the play of a game of chance of claim 21, further comprising:
determining the amount of the prize.

29. The method of facilitating the play of a game of chance of claim 28, further comprising:
receiving an indication of an amount wagered, wherein the amount of the prize is directly proportional to the amount wagered.

30. The method of facilitating the play of a game of chance of claim 21, wherein the transaction price is the price of an individual item chosen from a plurality of items purchased by a customer.

31. The method of facilitating the play of a game of chance of claim 21, wherein the transaction price is the total price of non-lottery items purchased by a customer.

32. An article of manufacture comprising a computer-readable medium having stored thereon instructions adapted to be executed by a processor, the instructions which, when executed, define a series of steps to be used to control a method for facilitating the play of a game of chance, the method comprising:
receiving information indicative of a transaction price for a non-lottery purchase transaction;
as part of completing the purchase transaction, providing a lottery number; and
conditioned on a comparison between the digits of the transaction price and the digits of the lottery number satisfying a matching condition determined by the rules of the game, awarding a prize.

33. An article of manufacture comprising a computer-readable medium having stored thereon instructions adapted to be executed by a processor, the instructions which, when executed, define a series of steps to be used to control a method for facilitating the play of a lottery game, the method comprising:
receiving information indicative of a transaction price for a purchase transaction, the transaction price being a total price of non-lottery items purchased by a customer;
receiving information indicative of an amount wagered in the game of chance;
selecting an entry in a prize pool;
determining whether a receipt for the transaction should be a winning ticket based on information contained in the prize pool entry;
responsive to the information in the selected prize pool entry indicating that the receipt should be a winning ticket, generating a lottery number so that a predetermined function of the transaction price and the lottery number satisfies a predetermined matching condition;
responsive to the information in the selected prize pool entry indicating that the receipt should not be a winning ticket, generating the lottery number so that the predetermined function of the transaction price and the lottery number does not satisfy the predetermined matching condition;
determining a prize amount for the receipt if the receipt is a winning ticket, the prize amount being directly proportional to the amount wagered;
printing the receipt, the receipt including
the transaction price,
an indication of the amount wagered in the game of chance;
if the receipt is a winning ticket, the prize amount,
the lottery number, wherein whether the lottery number is a winner is conditioned upon whether the predetermined function of the transaction price and the lottery number satisfies the predetermined matching condition;
receiving a request to redeem the receipt for the prize amount;
verifying that the receipt is a valid winning ticket;
verifying that the receipt has not been previously redeemed for a prize;
responsive to the receipt being a valid winning ticket and not having previously been redeemed, providing an indication that the ticket should be redeemed for the prize amount; and
recording that the receipt has been redeemed.

34. The method of claim 22, wherein
the transaction price is a total price of non-lottery purchases made by a customer at a point of sale terminal.

35. The method of claim 22, further comprising:
printing a jackpot prize amount on the receipt;
printing an indication on the receipt that the jackpot prize amount has been won if the lottery number is identical to the transaction price.

36. The method of claim 22, further comprising:
printing an indication on the receipt that the sales receipt is not a winner if no digit of the lottery number matches a corresponding digit of the transaction price; and
printing an indication on the receipt that a prize has been won if at least one digit of the lottery number matches a corresponding digit of the transaction price number.

37. The method of claim 36, further comprising:
printing an indication on the receipt of a prize amount that is a function of the position of the at least one digit of the lottery number that matches a corresponding digit of the transaction price.

38. The method of claim 22, further comprising:
printing an authentication code on the receipt, the authentication code indicative of whether the receipt is a valid winning ticket.

39. The method of facilitating of claim 1, wherein the associated transaction price is the total price of the non-lottery items purchased in the transaction.

40. The method of facilitating of claim 1, wherein the associated transaction price is the price of a single non-lottery item purchased in the transaction, the transaction including a plurality of non-lottery items.

* * * * *